United States Patent [19]

Hart et al.

[11] Patent Number: 4,599,261
[45] Date of Patent: Jul. 8, 1986

[54] HIGH HEAT, SOUND DAMPING METAL-POLYMER LAMINATE

[75] Inventors: William W. C. Hart, Katy; William H. Korcz, Houston, both of Tex.

[73] Assignee: Shell Oil Company, Houston, Tex.

[21] Appl. No.: 577,646

[22] Filed: Feb. 6, 1984

[51] Int. Cl.$^4$ .............................................. B32B 7/02
[52] U.S. Cl. .................................... 428/213; 428/412; 428/461; 428/463; 428/468; 428/475.5; 428/474.4; 525/92
[58] Field of Search ..................... 428/216, 458, 475.5, 428/474.4, 213, 412, 461, 463, 468; 525/92

[56] References Cited

U.S. PATENT DOCUMENTS

| | | | |
|---|---|---|---|
| 3,582,427 | 6/1971 | Backni | 156/283 |
| 3,595,942 | 7/1971 | Wald et al. | 525/332.9 |
| 4,081,424 | 3/1978 | Gergen et al. | 525/92 |
| 4,111,895 | 9/1978 | Gergen et al. | 525/92 |
| 4,204,022 | 5/1980 | Synder et al. | 428/337 |
| 4,229,504 | 10/1980 | Brachman | 428/461 |
| 4,313,996 | 2/1982 | Newman et al. | 428/215 |
| 4,369,222 | 1/1983 | Hedrick et al. | 428/216 |

FOREIGN PATENT DOCUMENTS

19835 12/1980 European Pat. Off. .

*Primary Examiner*—Edith Buffalow
*Attorney, Agent, or Firm*—Dean F. Vance

[57] ABSTRACT

A novel metal-polymer-metal structural laminate is disclosed having an unexpected balance of property advantages including light weight, sound damping, good adhesion between polymer and metal, high stiffness and automotive paint bake oven stability. The high heat, sound damping laminate has a polymeric resinous core comprising the blend of an engineering thermoplastic resin, butene-1 polymer and a selectively hydrogenated monoalkenyl arene-conjugated diene block copolymer.

18 Claims, 7 Drawing Figures

FIG. 1 LAMINATE DAMPING
○ MPL-1, 4.39 Kg/m², 1000 mm, 11 Pam³
□ STEEL, 6.98 Kg/m², 0.889 mm 11 Pam³

*FIG. 2* LAMINATE RIGIDITY

FIG. 3 PANEL TRANSMISSION LOSS

FIG. 4 COMPARISON OF THEORETICAL TRANSMISSION LOSS AND MEASURED NOISE REDUCTION FOR .61m × .61m PANELS

FIG. 6 LAMINATE DAMPING. VISCOELASTIC CORE, TWO METAL FACES, ROOM TEMPERATURE.

FIG. 7 LAMINATE RIGIDITY. VISCOELASTIC CORE, TWO METAL FACES, ROOM TEMPERATURE.

HIGH HEAT, SOUND DAMPING METAL-POLYMER LAMINATE

BACKGROUND OF THE INVENTION

1. Field of the Invention

This invention relates to metal-polymer laminates and to their preparation. More particularly, this invention relates to novel metal-polymer-metal structural laminates having a unique combination of property advantages.

2. Description of the Prior Art

Metal-plastic-metal laminates have been described in various U.S. and foreign patents. Exemplary patents include U.S. Pat. No. 3,582,427, U.S. Pat. No. 4,229,504, U.S. Pat. No. 4,204,022, U.S. Pat. No. 4,313,996, U.S. Pat. No. 4,369,222 and EPA 19,835. These laminates are useful as light weight replacements for sheet steel in cars and trucks. Relatively thin laminates are useful in flexible packaging end use applications while relatively thick laminates are useful as construction laminates.

Methods of preparing such laminates are also known. One method includes bringing at least one layer of plastic and at least one layer of metal into intimate contact and subjecting them to suitable heat and pressure, using, for example, a platen press. A more efficient and continuous method involves the well known extrusion processes—extrusion coating or extrusion lamination. Often an intermediate layer of adhesive or primer, in the form of a film or coating, is used in conjunction with these methods in insure adequate adhesion between the metal substrate and the plastic.

In the past, one primary incentive for considering the replacement of sheet steel with metal-polymer laminates was the weight saving that could be obtained with equivalent stiffness. Placing thin steel skins on the outside of the laminate optimal use of high yield, high modulus steel and allows the structurally ineffective (in bending) middle portion of the composite to be light weight plastic, resulting in the primary advantage of steel-plastic laminates—weight reduction versus an equivalent stiffness sheet steel, but at substantially less cost penalty compared to other weight-reducing materials such as aluminum sheet. In other cases it has been desired to obtain sound or vibration damping from the laminate. In the past, in order to obtain such vibration damping, manufacturers would provide a laminate having relatively thick skins (15 or 20 mils) and a relatively thin, low modulus viscoelastic polymer core (3 to 6 mils). However, in order to obtain equivalent stiffness to the steel it replaced, it was necessary to increase the overall thickness of the steel in the sound damping laminate. This resulted in a much heavier laminate than the equivalent stiffness steel it replaced. What is needed are laminates that provide both light weight and sound damping.

SUMMARY OF THE INVENTION

The present invention deals with a metal-polymer-metal structural laminate having an unexpected balance of properties including light weight, high stiffness, improved sound damping and automotive paint bake oven stability. In particular, the present invention deals with a metal-polymer-metal structural laminate comprising a core of polymeric resinous material having tightly adhered to each side thereof a metal skin layer wherein:

(a) said metal skin layer is about 5 to about 40 mils thick;

(b) laminate has a ratio of core thickness to skin thickness of between about 1:3 and about 20:1;

(c) said laminate total thickness is between about 15 mils and about 300 mils; and (d) said polymeric resinous material comprises the admixture obtained by intimately mixing a block copolymer, a butene-1 polymer and an engineering thermoplastic resin so as to form at least partial continuous interlocking networks wherein (i) said block copolymer comprises at least two monoalkenyl arene polymer end blocks A and at least one substantially completely hydrogenated conjugated diene mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000;

(ii) said engineering thermoplastic resin has a generally crystalline structure and a melting point over about 120° C.; and (iii) said butene-1 polymer is selected from the group consisting of butene-1 homopolymers, butene-1-alphamonoolefin copolymers, functionalized butene-1 homopolymers, functionalized butene-1-alphamonoolefin copolymers and mixtures thereof where said alphamonoolefin is selected from ethylene, propylene and $C_5$ to $C_{10}$ alphamonoolefins and the alphamonoolefin content of said copolymers is between about 0.1 and about 30.0 mole percent.

As used herein, the term "tightly adhered" means a lap shear value of at least about 500 psi at room temperature as measured by ASTM D 3164-73 using a lap length of about 0.25 inch.

The laminates of the present invention have a unique combination of property advantages. These laminates have demonstrated the primary advantage, weight reduction versus an equivalence stiffness sheet steel while in addition demonstrating a significant property advantage by showing a large reduction in structural borne noise. This combination of weight reduction, sound damping and high stiffness has never before been offered in a single laminate structure. An important attribute of these laminates is their stiffness relative to steel. It is possible to obtain equivalence stiffness to steel with only about a 5 to 10% increase in overall thickness. This means that it is possible to employ existing stamping dies to stamp parts. In addition, the small increase in thickness results in a large decrease in weight. The laminates of the present invention have significantly improved sound damping characteristics and in addition may be tailored so as to obtain the amount damping required at various frequencies and/or temperatures.

BRIEF DESCRIPTION OF THE DRAWING

FIGS. 1, 2, 4 and 5 disclose various properties of metal polymer laminates containing butene-1 polymers versus steel.

DETAILED DESCRIPTION OF THE INVENTION

The metal skin layers which are used in accordance with this invention each have a thickness of about 5 to about 40 mils (thousands of an inch), preferably about 8 to about 20 mils. The metal skin layer can be formed, for example, from aluminum, aluminum alloys, alloy-clad aluminum, surface modified copper, bronze, magnesium or magnesium alloys, steel, tin-free steel, tin-plate steel, aluminized steel, stainless steel, surface modified copper-clad stainless steel, terneplate steel, galvanized steel, chrome or chrome treated steel and the like. These metals may also be surface treated or have thereon surface conversion coatings. A preferred group of metals is steel and steel alloys. Steel alloys include the chrome/chrome oxide coated steel substrate or so-called tin-free steel (TFS) described in Canadian Pat. No. 808,630 and U.S. Pat. Nos. 3,526,486 and 3,826,628, the teachings of which are hereby incorporated by reference, and zinc-coated alloys. The thickness of discrete layers of chromium metal and chromium oxide may be controlled by varying plating bath parameters as is well known in the art. The metal skin of most preference is regular cold rolled steel, termed black plate.

The metal skin layers on each side of the core can be formed of the same metal or of different metals and can have same or different thicknesses.

The sound damping, high temperature stability characteristics of the present invention result from the selection of the particular resinous polymeric material employed as the core herein.

The resinous polymer material employed herein is the admixture obtained by intimately mixing a certain block copolymer, a butene-1 polymer and an engineering thermoplastic so as to form at least partial continuous interlocking networks.

The block copolymer of the instant invention effectively acts as a mechanical or structural stabilizer which interlocks the polymer structure networks and prevents the consequent separation of the polymers during processing and their subsequent use. As defined more fully hereinafter, the resulting structure of the instant polyblend is that of at least partial continuous interlocking networks. This interlocked structure results in a dimensionally stable polyblend that will not delaminate upon extrusion and subsequent use.

To produce stable blends it is necessary that the polymers have at least partial continuous networks which interlock with each other. In an ideal situation the polymers would have complete continuous networks which interlock with each other. A partial continuous network means that a portion of the polymer has a continuous network phase while the other portion has a disperse phase structure. Preferably, a major proportion (greater than 50% by weight) of the partial continuous network is continuous.

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difuctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkanes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystryene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene).

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes in styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 55% by weight of the block copolymer, preferably between about 10 and 30% by weight.

While the average molecular weight of the individual blocks is not critical, at least within the above specified limits, it is important to select the type and total molecular weight of the block copolymer in order to ensure the compatibility necessary to get the interlocking network under the chosen blending conditions. As discussed more fully hereinafter, best results are obtained when the viscosity of the block copolymer, butene-1 polymer and the engineering thermoplastic resin are substantially the same at the temperature used for blending and processing. In some instances, matching of the viscosity of the block copolymer portion and the resin portion are best achieved by using two or more block copoymers or resins. For example, a blend of two block copolymers having different molecular weights or a blend of a hydrogenated SBS and hydrogenated SIS polymers may be employed.

Matching of the viscosity of the polymers may also be accomplished by adding supplemental blending components such as hydrocarbon oils and other resins. These supplementary components may be blended with the block copolymer portion or butene-1 polymer portion or the engineering thermoplastic resin portion, but it is preferred to add the additional coponents to the block copolymer portion. This pre-blended block copolymer composition is then intimately mixed with the engineering thermoplastic resin and butene-1 polymer to form compositions according to the present invention.

The types of oils useful in the practice of this invention are those polymer extending oils ordinarily used in the processing of rubber and plastics, e.g., rubber compounding oils. Especially preferred are the types of oil that are compatible with the elastomeric segment of the block copolymer. While oils of higher aromatics content are satisfactory, those petroleum-based white oils having low volatility and less than 50% aromatics content as determined by the clay gel method of tentative ASTM method D 2007 are particularly preferred. The oils should additionally have low volatility, preferably having an initial boiling point above 500° F. The amount of oil employed varies from about 0 to about 100 phr (parts by weight per hundred parts by weight rubber, or block copolymer as in this case), preferably about 5 to about 30 phr.

One of the other components in the admixture used for the resinous core is an engineering thermoplastic resin. The label engineering thermoplastic resin has come to be applied to those polymers that possess a property balance comprising strength, stiffness, impact, and long term dimensional stability. Preferably these engineering thermoplastic resins have glass transition temperatures or apparent crystalline melting points (defined as that temperature at which the modulus, at low stress, shows a catastrophic drop) of over about 120° C., more preferably between about 150° C. and about 350° C., and are capable of forming a continuous network structure through a thermally reversible crosslinking mechanism. Such thermally reversible crosslinking mechanisms include crystallites, polar aggregations, ionic aggregations, lamellae, or hydrogen bonding. In a specific embodiment, where the viscosity of the block copolymer or blended block copolymer composition at processing temperature $T_p$ and a shear rate of 100 $sec^{-1}$ is $\eta$, the ratio of the viscosity of the engineering thermoplastic resins, or blend of engineering thermoplastic resin with viscosity modifiers to $\eta$ should be between about 0.2 and about 4.0, preferably about 0.08 and about 1.2. As used in the specification and claims, the viscosity of the block copolymer and the thermoplastic engineering resin is the "melt viscosity" obtained by employing a piston driven capillary melt rheometer at constant shear rate and at some consistent temperature above melting, say 260° C. The upper limit (350° C.) on apparent crystalline melting point or glass transition temperature is set so that the resin may be processed in low to medium shear rate equipment at commercial temperature levels of 350° C. or less. The engineering thermoplastic resin also includes blends of various engineering thermoplastic resins.

By way of specific example, the various polymers found in the classes listed in Table A below and thereafter defined are within the definition of engineering thermoplastic resins:

TABLE A

1. Polycarbonates
2. Thermoplastic polyesters
3. Poly(aryl ethers) and Poly(aryl sulfones)
4. Polyamides
5. Acetal resins
6. Thermoplastic polyurethanes
7. Halogenated thermoplastics
8. Nitrile barrier resins These various engineering thermoplastic resins are further defined in U.S. Pat. No. 4,111,895, which is herein incorporated by reference. Other patents dealing with blends of the subject block copolymer and engineering thermoplastic resins are shown in Table B below:

TABLE B

U.S. Pat. No. 4,041,103
U.S. Pat. No. 4,079,099
U.S. Pat. No. 4,079,100
U.S. Pat. No. 4,080,403
U.S. Pat. No. 4,088,711
U.S. Pat. No. 4,096,204
U.S. Pat. No. 4,101,605
U.S. Pat. No. 4,080,356
U.S. Pat. No. 4,080,357
U.S. Pat. No. 4,081,424
U.S. Pat. No. 4,085,163
U.S. Pat. No. 4,088,626
U.S. Pat. No. 4,088,627

U.S. Pat. No. 4,090,996
U.S. Pat. No. 4,102,854
U.S. Pat. No. 4,107,130
U.S. Pat. No. 4,107,131
U.S. Pat. No. 4,110,303
U.S. Pat. No. 4,111,894
U.S. Pat. No. 4,111,896
U.S. Pat. No. 4,119,607
U.S. Pat. No. 4,126,600
U.S. Pat. No. 4,242,470

The sound damping characteristics of the present invention result from the selection of the butene-1 polymer contained in the particular resinous polymeric material employed as the core herein. The resinous polymeric material employed in this invention contains at least fifteen percent by weight of a crystalline butene-1 polymer selected from the group consisting of butene-1 homopolymers, butene-1-alphamonoolefin copolymers, functionalized butene-1 homopolymers, functionalized butene-1-alphamonoolefin copolymers and mixtures thereof where said alphamonoolefin is selected from ethylene, propylene and $C_5$ to $C_{10}$ alphamonoolefins and the alphamonoolefin content of said copolymers is between about 0.1 and about 30.0 mole percent. The preferred alpha-monoolefin in the butene-1 copolymers is ethylene and propylene with ethylene being most preferred. Functionalized butene-1 polymers and copolymers are polymers modified by monomers having reactive carboxylic acid groups, typically from 1 to 30, preferably from 2 to 20 percent by weight of an ethylenically unsaturated carboxylic acid. Specific examples of such suitable ethylenically unsaturated carboxylic acids (which term includes mono-and polybasic acids, acid anhydrides, and partial esters of polybasic acids) are acrylic acid, methacrylic acid, crotonic acid, fumaric acid, maleic acid, itaconic acid, maleric anyydride monomethyl malcate, monoethyl malcate, monomethyl, fumarate, monoethyl fumarate, tripropylene glycol monomethyl ether acid malcate, or ethylene glycol monophenyl ether acid malcate. The carboxlic acid monomer is preferably selected from a β-ethylenically unsaturated mono-and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The functionalized polymer can also contain other copolymerizable monomers including an ester of acrylic acid. The comonomers can be combined in the polymer in any way, e.g., as random copolymers, as block or sequential copolymers, or as graft copolymers. Materials of these kinds and methods of making them are readily known in the art. Specific examples of such copolymers are butene-1 acrylic acid copolymer, butene-1methacrylic acid copolymer, butene-1 maleic acid copolymer and the like. The two preferred butene-1 polymers are isotactic butene-1 homopolymers (polybutylene) and isotactic butene-1-ethylene copolymers. The butene-1 polymers have number average molecular weights above 15,000, preferably above 20,000. Suitable butene-1 ethylene copolymers contain from about 0.1 to 30 mole percent, preferably from about 5 to 15 mole percent ethylene. The butene-1-ethylene copolymers are typically more difficult to crystallize at the same temperature than the butene-1 homopolymers. Suitable isotactic butene-1 polymers are commercially available and methods for their preparation are well known in the art, as shown in, for example, U.S. Pat. No. 3,362,940. Illustrative of butene-1 polymers suitable for use in the present invention (if the above requirements ae met) are those known in the industry as pipe, film, molding or additive grades. The most preferred butene-1 polymer is the ethylene-butene-1 copolymer.

In the present invention the various polymers are blended in such a way as to form co-continuous interlocking networks; i.e., where a continuous phase of one polymer would be throught of as filling the voids of a continuous phase of the second polymer. The interlocking structure of the various polymers does not show gross phase separation such as would lead to delamination. Further, the blend is not so intimately mixed that there is molecular mixing or miscibility, nor one in which the separate phases will lead to delamination.

Without wishing to be bound to any particular theory, it is considered that there are two general requirements for the formation of an interlocking network. First, there must be a primary phase network stable to the shearing field. This requirement is fulfilled by employing the block polymers of the instant invention having the capability of self-crosslinking (network formation) and furthermore having sufficiently high molecular weight to retain its network (domain) structure in processing. Second, the other polymers employed must be capable of some kind of chemical or physical crosslinks or other intermolecular association to maintain a continuous phase in the blend. The polymer must possess sufficient fluidity to interlock with the primary network in the blending process. This second requirement is met by the instant thermoplastic engineering resins and butene-1 polymers.

There are at least two methods (other than the absence of delamination) by which the presence of an interlocking network can be shown. In one method, an interlocking network is shown when molded or extruded objects made from the blends of this invention are placed in a refluxing solvent that quantitatively dissolves away the block copolymer and other soluble components, and the remaining polymer structure still has the shape and continuity of the molded or extruded object and is intact structurally without any crumbling or delamination, and the refluxing solvent carries no insoluble particulate matter. If these criteria are fulfilled, then both the unextracted and extracted phases are interlocking and continuous. The unextracted phase must be continuous because it is geometrically and mechanically intact. The extracted phase must have been continuous before extraction, since quantitative extraction of a dispersed phase from an insoluble matrix is highly unlikely. Finally, interlocking networks must be present in order to have simultaneous continuous phases. Also, confirmation of the continuity of the unexpected phase may be confirmed by microscopic examination.

In the second method, a mechanical property such as tensile modulus is measured and compared with that expected from an assumed system where each continuous isotropically distributed phase contributes a fraction of the mechanical response, proportional to its compositional fraction by volume. Corresponsence of the two valves indicates presence of the interlocking network, whereas, if the interlocking network is not present, the measured value is different than that of the predicted value.

An important aspect of the present invention is that the relative proportions of the various polymers in the blend can be varied over a wide range. The relative proportions of the polymers are presented below in parts by weight (the total blend comprising 100 parts):

|  | Preferred | More Preferred |
| --- | --- | --- |
| Engineering Thermoplastic | 60 to 20 | 50 to 25 |
| Butene-1 polymer | 15 to 40 | 20 to 35 |
| Block Copolymer | 25 to 40 | 30 to 40 |

Accordingly, it is possible to prepare a wide variety of polymer blends ranging from a flexibilized engineering thermoplastic to a stiffened elastomeric block copolymer. Note that the minimum amount of block copolymer necessary to achieve these blends may vary with the particular engineering thermoplastic.

The blending of the engineering thermoplastic resin, butene-1 polymer and the block copolymer may be done in any manner that produces a blend which will not delaminate on processing, i.e., in any manner that produces the interlocking network. For example, the resins and block copolymer may be dissolved in a solvent common for all and coagulated by admixing in a solvent in which none of the polymers are soluble. But more preferably, a particularly useful procedure is to intimately mix the polymers in the form of granules and/or powder in a high shear mixer. "Intimately mixing" means to mix the polymers with sufficient mechanical shear and thermal energy to ensure that interlocking of the various networks is achieved. Intimate mixing is typically achieved by employing high shear extrusion compounding machines such as twin screw compounding extruders and thermoplastic extruders having at least a 20:1 L/D ratio and a compression ratio of 3 or 4:1.

The mixing or processing temperature (Tp) is selected in accordance with the particular polymers to be blended. For example, when melt blending the polymers instead of solution blending, it will be necessary to select a processing temperature above the melting point of the highest melting point polymer. In addition, as explained more fully hereinafter, the processing temperature may also be chosen so as to permit the isoviscous mixing of the polymers. Typically, the mixing or processing temperature is between about 150° C. and about 400° C. For blends containing poly(butylene terephthalate) Tp is preferably between about 230° C. and about 300° C.

Another parameter that is important in melt blending to ensure the formation of interlocking networks is matching the viscosities of the block copolymer and the butene-1 polymer, engineering thermoplastic resin (isoviscous mixing) at the temperature and shear stress of the mixing process. The better the interdispersion of the butene-1 polymer and engineering resin in the block copolymer network, the better the chance for formation of co-continuous interlocking networks on subsequent cooling. Therefore, it has been found that when the block copolymer has a viscosity $\eta$ poise at temperature Tp and shear rate of 100 sec$^{-1}$, it is much preferred that the viscosity of the engineering thermoplastic resin or blend containing such resin have a viscosity at temperature Tp and a shear rate of 100 sec$^{-1}$ such that the ratio of the viscosity of the block copolymer over the viscosity of the engineering thermoplastic be between about 0.2 and about 4.0, preferably between about 0.8 and about 1.2. Accordingly, as used herein, isoviscous mixing means that the viscosity of the block copolymer divided by the viscosity of the other polymer or polymer blend at the temperature Tp is between about 0.2 and about 4.0. It should also be noted that within an extruder, there is a wide distribution of shear rates. Therefore, isoviscous mixing can occur even though the viscosity curves of the polymers differ at some of the shear rates.

The block copolymer or block copolymer blend may be selected to essentially match the viscosity of the butene-1 polymer and engineering resin. Optionally, the block copolymer may be mixed with a rubber compounding oil or supplemental resin as described hereinbefore to change the viscosity characteristics of the block copolymer.

The particular physical properties of the instant block copolymers are important in forming co-continuous interlocking networks. Specifically, the most preferred block copolymers of the instant invention when unblended do not melt in the ordinary sense with increasing temperature, since the viscosity of these polymers is highly non-Newtonian and tends to increase without limit as zero shear stress is approached. Further, the viscosity of these block copolymers is also relatively insensitive to temperature. This rheological behavior and inherent thermal stability of the block copolymer enhances its ability to retain its network (domain) structure in the melt so that when the various blends are made, interlocking and continuous networks are formed.

The viscosity behavior of the instant thermoplastic engineering resin, on the other hand, typically is more sensitive to temperature that than of the instant block copolymers. Accordingly, it is often possible to select a processing temperature Tp at which the viscosities of the block copolymer and engineering resin fall within the required range necessary to form interlocking networks.

The polymer blends of the instant invention may be compounded further with other polymers, oils, pigments, lubricants, fillers, reinforements, antioxidants, stabilizers, fire retardants, antiblocking agents and other rubber and plastic compounding ingredients without departing from the scope of this invention.

Examples of various fillers that can be employed are in the 1971-72 Modern Plastics Encyclopedia, pages 240-247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Some compositions are reinforced polymer blends of the instant invention containing about 2 to about 80 percent by weight glass fibers, based on the total weight of the resulting reinforced blend. In some cases it is desired that coupling agents, such as various silanes, be employed in the preparation of the reinforced blends.

The polymeric resinous materials of the core can be bonded directly to the metal skin layers or by the use of an intermediate adhesive layer there between or metal treatment or polymer treatments to improve the adhesive. The intermediate adhesve layer can have a thickness from about 0.001 to 5 mils, preferably from about 0.3 to 3.0 mils. Solution, emulsion or dispersion applied adhesives may be used at much lower thickness then coextruded laminate structures. When a separate layer (not an applied adhesive) is used, such layer may be formed from any thermoplastic polymeric resinous material which will tightly adhere the core layer to the metal skin layers. A particularly preferred adhesive layer is a normally solid thermoplastic propylene-based polymer modified by monomers having reactive carboxylic acid groups, particularly a copolymer of a major proportion of propylene and a minor proportion, typically from 1 to 30, preferably from 2 to 20 percent by weight of an ethylenically unsaturated carboxylic acid. Specific examples of such suitable ethylenically unsaturated carboxylic acids (which term includes mono- and polybasic acids, acid anhydrides, and partial esters of polybasic acids) are acrylic acid, methacrylic acid, crotonic acid, fumaric acid, maleic acid, itaconic acid, maleric anhydride monomethyl malcate, monoethyl malcate, monomethyl fumarate, monoethyl fumarate, tripropylene glycol monomethyl ether acid malcate, or ethylene glycol monophenyl ether acid malcate. The carboxylic acid monomer is preferably selected from a $\beta$-ethylenically unsaturated mono- and polycarboxylic acids and acid anhydrides having from 3 to 8 carbon atoms per molecule and partial esters of such polycarboxylic acid wherein the acid moeity has at least one carboxylic acid group and the alcohol moiety has from 1 to 20 carbon atoms. The copolymer can also contain other copolymerizable monomers including an ester of acrylic acid. The comonomers can be combined in the copolymer in any way, e.g., as random copolymers, as block or sequential copolymers, or as graft copolymers. Materials of these kinds and methods of making them are readily known in the art. Specific examples of such copolymers are propylene acrylic acid copolymer, propylene methacrylic acid copolymer, propylene maleic acid copolymer and the like.

The adhesive layer can first be applied to the metal skin layers, first be applied to the core, or can be applied to the metal skin layer and the core simultaneously. The adhesive layer can be applied using well known application techniques, such as, for example, solvent casting, roll coating, or, preferably, extrusion processes and the like. When the adhesive layer is to be combined with the core prior to the lamination thereto the metal skins, such layers can advantageously be introduced into the laminates by the well known coextrusion process or combining the conventional extrusion process with a film lamination technique.

Numerous solid fillers, reinforcing elements, pigments, lubricants, antioxidants and the like well known in the art can also be incorporated into the core or adhesive layers, provided the resultant laminate retains the hereinbefore prescribed characteristics.

In one embodiment of this invention, a metal-polymer-metal laminate is produced by disposing a layer of polymer resinous material, which layer is continuously extruded from a conventional, screw-type extruder between two metallic skin layers which are fed continuously to a nip formed by a pair of opposing and counter-rotating laminating rolls. Heat and pressure sufficient to affect a bond between the metal skin layers and the polymeric resinous material are applied to the skin layers. This is accomplished by heating one or both of the laminating rolls, by preheating metal skin layers, or through the heat of extrusion of the polymeric resinous material or combination of such heating steps. The distance between the laminating rolls at the nip can be controlled to exert effective pressure to metal-polymer-metal laminate to ensure adequate bond between the metal skins and the polymer core. The laminating rolls can be covered with a layer of polytetrafluoroethylene or other release material to prevent sticking of polymeric resinous material to the rolls.

In another embodiment of this invention, the metal skin layers are first coated with an adhesive layer on one side thereof and are fed continously to the combining nip with the coated sides facing toward each other. A layer of polymeric resinous material is disposed between the two adhesive coated skin layers by continuous extrusion as described hereinabove. In still another embodiment, a platen press may be employed to make the laminates similar to the presses used to make plastic laminates.

In yet another embodiment of this invention, a multi-layered extrudate comprising an adhesive layer—a core layer—an adhesive layer is disposed continuously and simultaneously between the two metal skin layers or precoated metal skin layers by the well known coextrusion process.

The present invention is not limited by the process used to prepare the metal-polymer-metal structural laminates. Extrusion processes, i.e., extrusion coating or extrusion lamination, film lamination techniques, solution coating techniques or combination of such techniques well known in the art can readily be used to produce the laminates of this invention. It is essential, however, that the thermoplastic polymer resinous material of the adhesive layer and core layer be subjected to a temperature at least equal to the softening point thereof, for a period of time sufficient to cause the polymer to tightly adhere but not undergo significant degradation thereof, and effective pressure to achieve intimate contact between the polymer layers and the metal skin layers.

An important consideration in obtaining both light weight laminates and sound damping laminates is the ratio of core thickness to skin thickness. The ratio of core thickness to skin thickness should be between 1:3 and 20:1, preferably between 1:2 and 3:1. These ratios include the thickness of any adhesive layer. The skin thickness includes both skins. The total laminate thickness should be between 15 mils and 300 mils, preferably between 25 mils and 60 mils.

The lower modulus of the polymeric core has little effect on the bending rigidity of the laminate, given that the skins total thickness is typically a minimum of 30% of the total laminate thickness. However, core properties do come into play during forming of parts due to in-plane compression and tension of the laminate stamping blank. Therefore, one skilled in the art has the options through filling, coextrusion and polymer blending to adjust the core properties for improved forming. Filling with such minerals as $CaCO_3$, mica, etc. will enhance the modulus of the core material and reduce wrinkling during post stamping. Blending with other polymers such as polypropylene will stiffen the core. Building of lamina of various polymers in the core by coextrusion, for example, will affect the buckling or wrinkling during forming.

To illustrate the present invention, the following comparative examples and illustratve embodiments are given. It is to be understood, however, that the embodiments are given for the purpose of illustration only and the invention is not to be regarded as limited to any of the specific materials or conditions used in the specific embodiments.

In Comparative Examples I and II, a laminate is compared to an equivalent stiffness sheet steel with regard to vibrational characteristics (damping) and accoustical characteristics (transmission loss). In both examples, laminates designated MPL-1 were prepared using ECCS skins having a thickness of 10 mils. The core was a butene-1-ethylene copolymer having an ethylene content of about 3 percent by weight. Thin adhesive layers were employed on both sides of the core to obtain the desired adhesion between core and skins. The thickness of the core layer (including adhesive cap layers) was about 20 mils, and the overall thickness of the laminate after preparation on the platen press was about 40 mils.

COMPARATIVE EXAMPLE #1

In Comparative Example I, vibration tests on cantilevered beams of MPL-1 were conducted.

When a sound wave impinges on one side of a finite, simply-supported, rectangular panel, it excites the panel into vibration. The vibrating panel in turn radiates sound into the surrounding medium on both of its sides. The ratio of the acoustic power "transmitted" into the medium on side 2 divided by the acoustic power incident on side 1 is defined as the panel transmission coefficient. $10\log_{10}$ of the inverse of the transmission coefficient is defined as the transmission loss of the panel.

Figure 3:
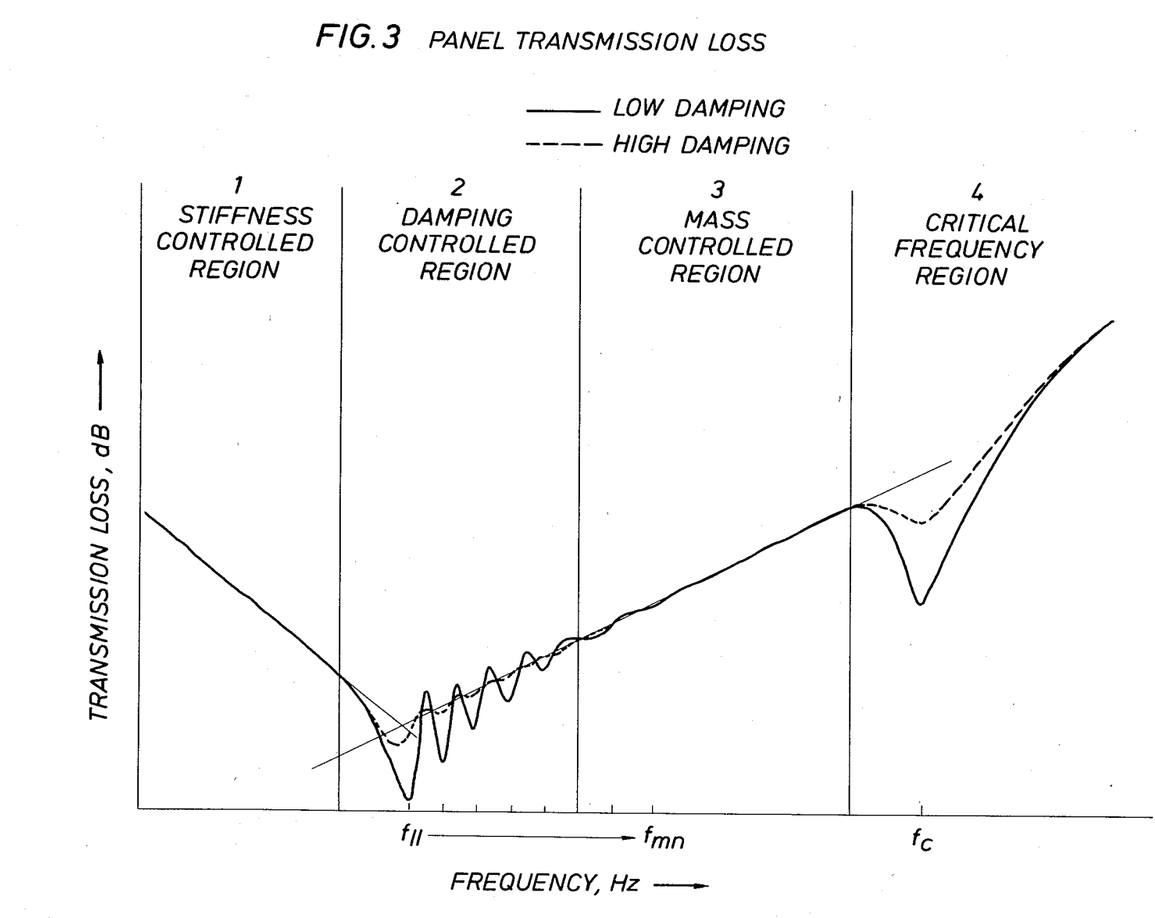
FIG. 3 shows a transmission loss versus frequency curve for a typical panel.

For a typical panel, a transmission loss versus frequency curve looks like FIG. 3. In frequency regions 1 and 2, an increase in panel stiffness, decreases panel vibration, increases transmission loss, and shifts region 2 to higher frequencies. In regions 3 and 2, an increase in panel mass, decreases vibration, increases transmission loss, and shifts region 2 to lower frequencies.

In region 2, while stiffness and mass have the effects just mentioned, the panel vibration and subsequent transmission loss are controlled primarily by damping in the vicinity of the resonance frequencies. Here, increasing dmaping decreases vibration and increases transmission loss. Region 2 extends from $1 \leq f/f_{11} \leq 20$, where $f_{11}$ is the lowest panel resonance. In region 4, stiffness and damping, as well as mass, again become important.

Beam damping loss factors were computed using the half-power method, i.e., $$n_n = \Delta f_{0.707}/f_n$$

where $f_n$ is the resonance frequency of the nth mode of vibration, i.e., the frequency of maximum gain between excitation and response, and $\Delta_{0.707}$ is the bandwidth of the gain resonance peak at 0.707 times its peak value.

Beam flexural rigidity and modulus of elasticity were calculated from $$B_n = \epsilon_n h^3/12 = 4\pi^2 p h/^4 f_n^2/\gamma_n^2$$

$\gamma_n$ is the modal boundary-condition constant which may be obtained from most vibration texts.

Figure 1:
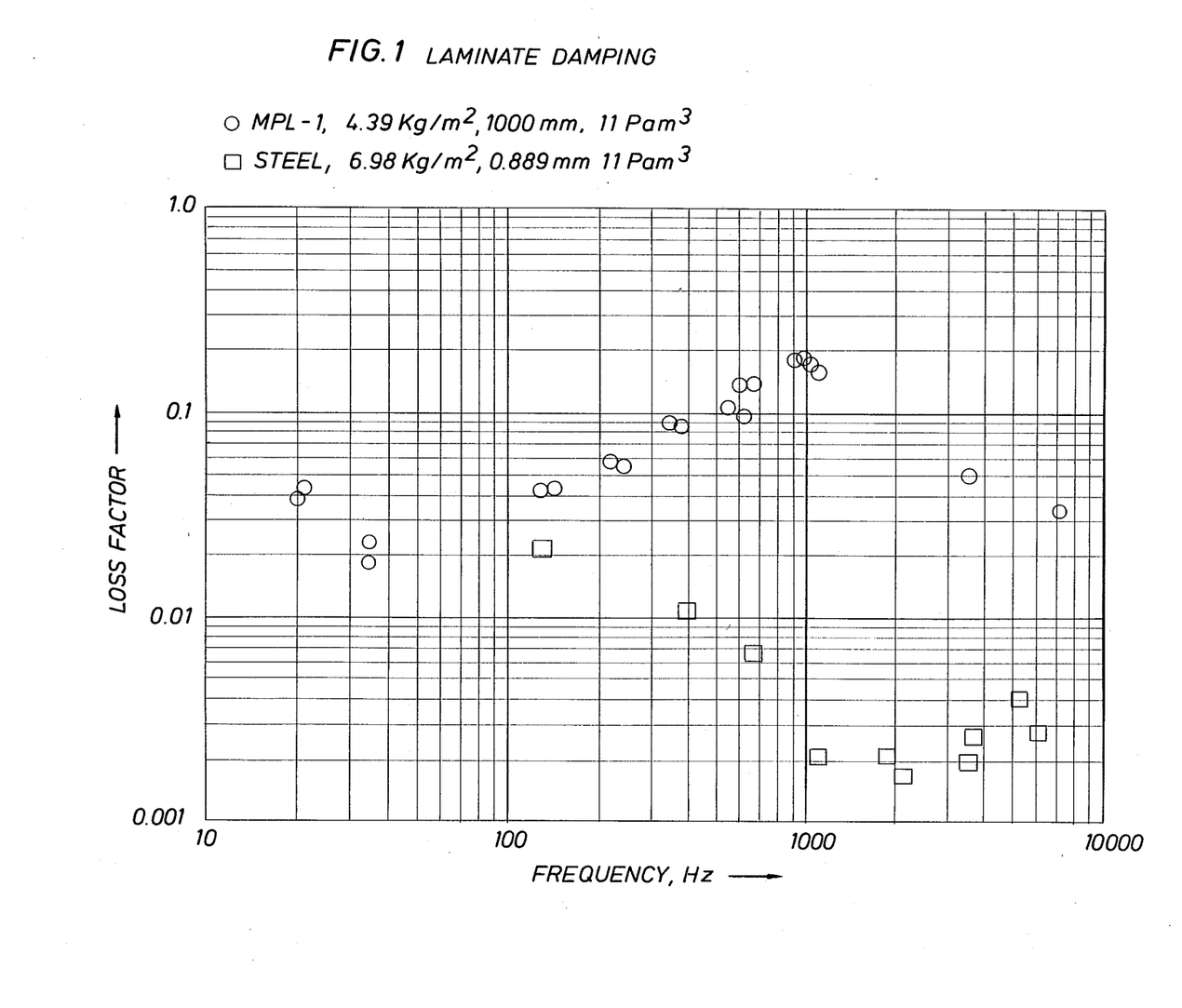
FIG. 1 deals with damping and plots frequency versus loss factor.
Figure 2:
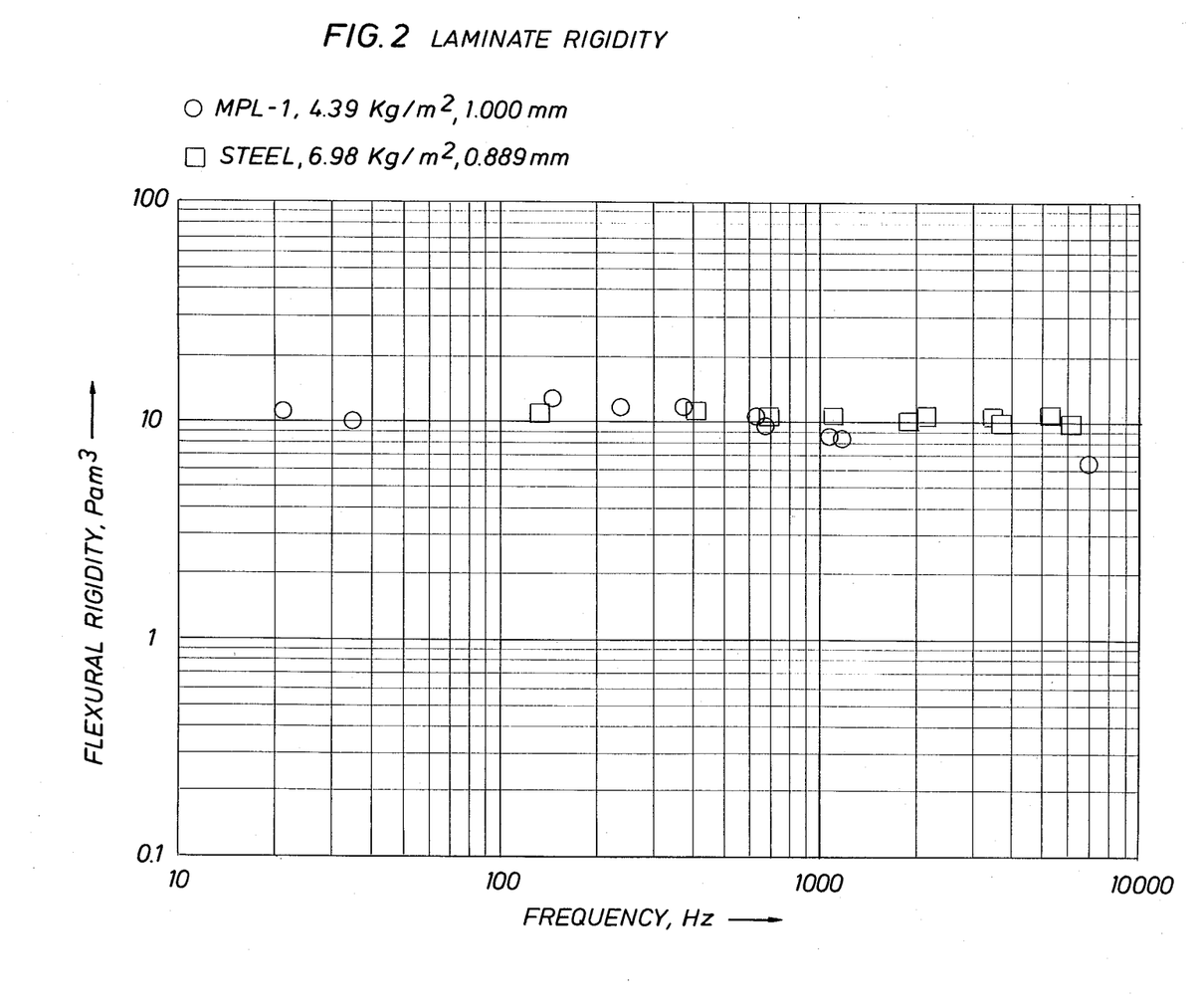
FIG. 2 deals with rigidity and plots frequency versus flexural rigidity.

In FIGS. 1 and 2, n and B are shown for the MPL-1 laminate and compared them with steel. It is seen that the damping of MPL-1 is considerably better than that of steel for the 100–10,000 Hz frequency range. The stiffness of this MPL-1 specimen is equivalent to steel over the 0–700 Hz range. Above 700 Hz, the MPL-1 stiffness decreases with increasing frequency. However, the mass of this MPL-1 specimen is 37% less than the mass of steel for the specimen thickness shown in the figures. Note that if the thickness of MPL-1 was increased appropriately to provide the same mass as that of steel, its stiffness would be considerably higher.

COMPARATIVE EXAMPLE #2

Airborne noise reduction tests were conducted on a steel panel; an MPL-1 panel of equal stiffness; a wall system composed of the steel panel, a cavity filled with absorbing material, and a limp plastic barrier; and a similar wall system with the MPL-1 panel replacing the steel. Their tests were conducted in approximate accord with the SAE recommended practice. "Laboratory Measurement of Airborne Noise Reduction Materials", SAE Recommended Practice J1400, May 1982.

In the tests specified above, a limp reference panel, e.g., lead, and the test panel of interest are, in turn, mounted in an opening in the wall between the source room and the receiving chamber. Space-averaged, ⅓ octave band sound pressure levels are obtained for both rooms, and the ⅓-octave measured noise reduction for each panel is calculated from $$NMR - SPL_{SR} - SPL_{RR}$$

A "correlation factor" between the measured noise reduction and the theoretical transmission loss is obtained for the limp panel via $$CF_1 = MNR_1 - TL_1$$

The measured noise reduction of the test panel is then adjusted to obtain an estimate of panel transmission loss via $$TL_t = MNR_t - CF_1$$

If a limp panel is in fact used, this procedure is reasonable, since the panel obeys the mass low over a wide frequency range. Therefore, $CF_1$ adjusts for non-ideal conditions in the sound field, the rooms, and the measurement and averaging procedures, i.e., it calibrates the test facility. In this embodiment a relatively stiff steel panel was used for the reference. Since the steel panel contains lightly damped resonances in the 10–300 Hz range, as does the test panel, subtraction of the resonance- and damping-contaminated steel data from the test panel data will obscure any absolute characteristics of interest for the test panel. Of course, the relative differences between steel and the test panel are maintained.

For this reason, the actual space-averaged SPL data was used. The MNR was then calculated for all configurations tested.

Figure 4:
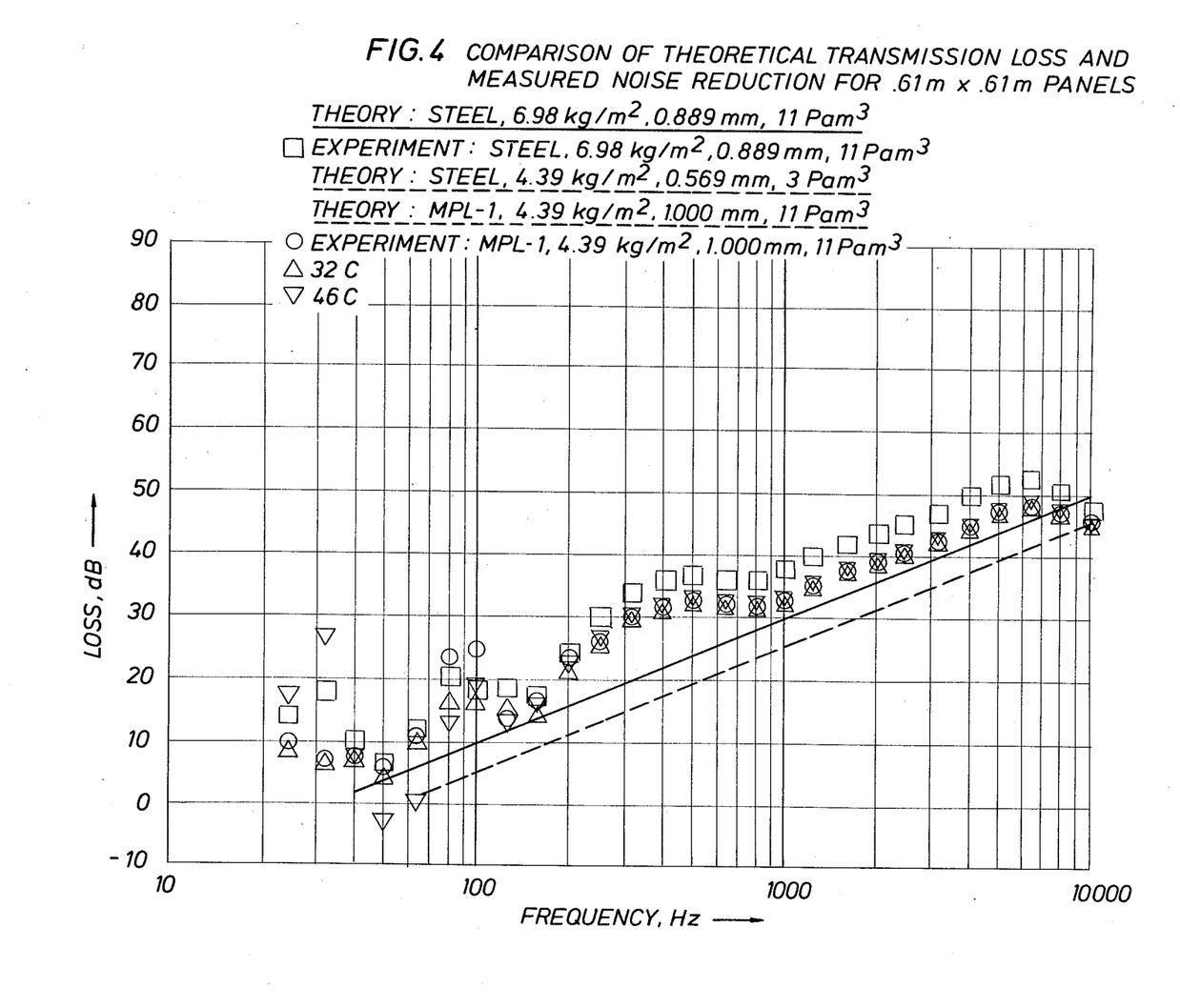
FIGS. 4 and 5 compare theoretical transmission loss and measured noise reduction.
Figure 5:
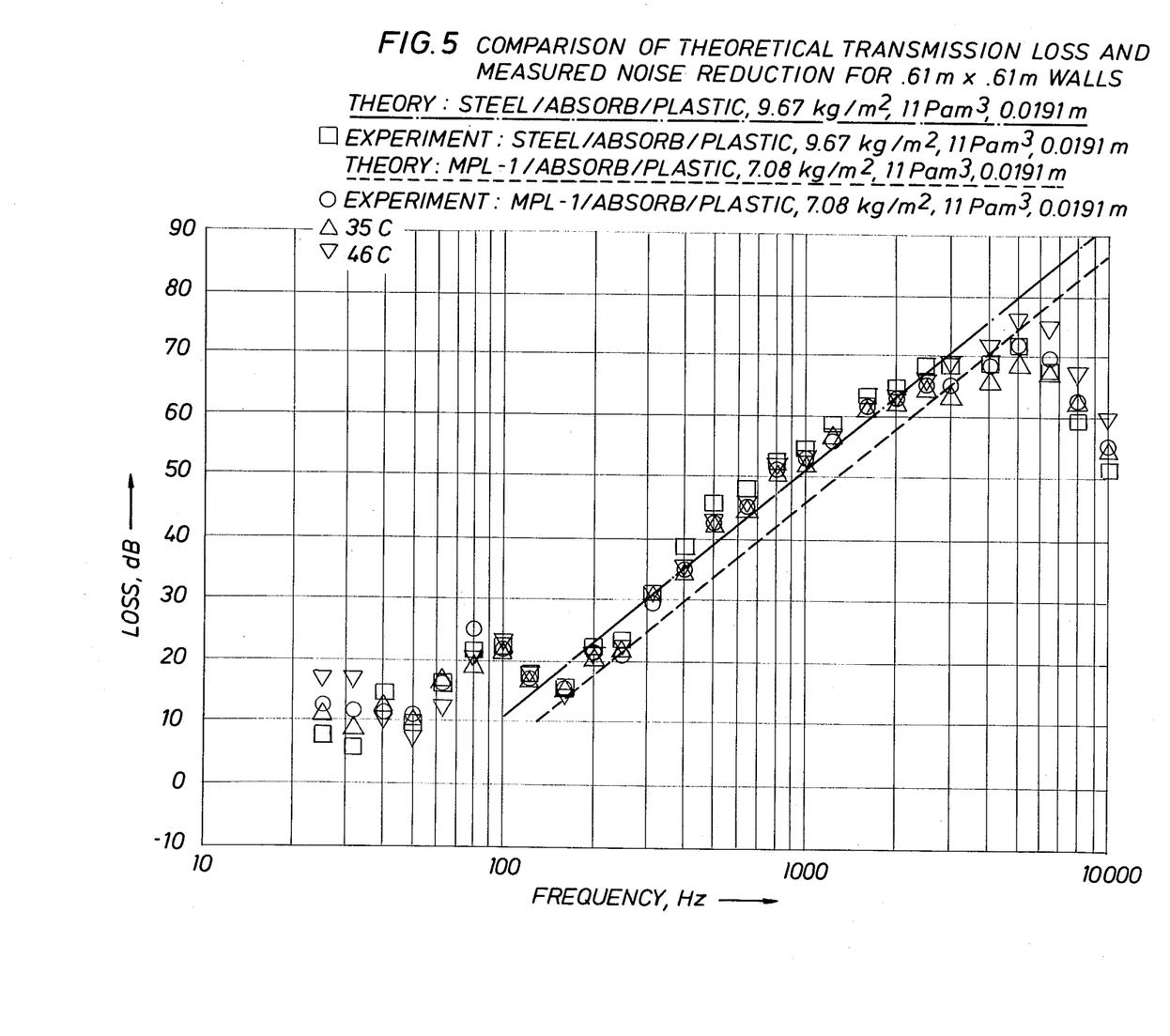

In FIG. 4 the MNR is shown for the steel and MPL-panels. The calculated $TL_F$ are also shown for both panels. FIG. 5 shows the same quantities for the wall systems. Also included are the measured data for MPL-1 at higher-than-room temperatures in both figures.

In FIG. 4, it is seen that the theoretical mass law predicts $TL_S - TL_L = 3.5$ dB, when the steel and MPL-1 panels are designed for equal stiffness. If the thicknesses of the two panels are designed for equal yield equal mass, then their theoretical TL would be equal, but MPL-1 would be a significantly stiffer structural element, as shown in FIG. 4 legend.

The MNR of both steel and MPL-1 both follow the mass-law frequency trend (6 dB increase per doubling of frequency) between 1000–6000 Hz; however, they lie some 8 dB above their respective $TL_F$ curves. Also the MNR between steel and MPL-1 is 3.5 dB, as predicted by mass-law, over the 250–6000 Hz range. The onset of the critical condition is seen to occur above 6300 Hz.

Below 250 Hz there are some 9 resonances in each panel. Either MPL-1 or steel may have the higher MNR here, depending upon the resonance frequency, the number of resonances within a ⅓-octave band and/or the amount of damping present. If the panels were adjusted to have equal mass, MPL-1 would have the advantages of higher stiffness, higher TL, lower vibration response, the lower structural borne sound radiation in this region. Above 250 Hz the MNR's of steel and MPL-1 would be identical.

TL temperature affects the damping and stiffness of MPL-1 in a manner that may increase or decrease its TL in the low frequency range. However, above 100 Hz, the temperatures studied had virtually no effect.

In FIG. 5 the theoretical TL and the MNR for steel and MPL-1 in the wall configuration are compared. It is seen that similar behavior to that of the panels alone in that the two systems obey the mass-law prediced slope of 12 dB/octave over the 500–1600 Hz range. Above 1600 Hz the MNR became affected by stiffness and damping as the critical frequencies of the panel and barrier are approached. Below 500 Hz stiffness and damping are important. In addition, the slight dip associated with the lowest mass-air-mass resonance in the 200–400 Hz range is shown.

An important difference in the mass-law region, over the single panel results of FIG. 4, is that the predicted 3.5 dB advantage of steel over equal-stiffness MPL-1 is not realized. With few exceptions the differences are 1 dB or less. The (MNR-$TL_F$) difference is now about 7 dB for MPL-1 and 3–4 dB for steel, i.e., for some reason the steel did not act to achieve the maximum Tl.

Another important difference is that there is less fluctuation in low frequency MNR than for the single panels, i.e., the resonance effects are not as great. Here, MPL-1 consistently outperforms steel.

Hence, for dual walls and MPL-1 system is not only as stiff as the steel system, it weighs less, vibrates less, radiates less structure borne sound, the transmits no more incident sound over the entire spectrum. If the masses of the steel and MPL-1 panels were adjusted to be equal, then the MPL-1 wall would be a stiffer structural system and have a definite noise reduction advantage over the entire frequency spectrum.

ILLUSTRATIVE EMBODIMENT #1

In Illustrative Embodiment 1, a number of hybrid constrained layer, metal-polymer laminates were tested to determine their vibration damping and sound barrier characteristics. The hybrid viscoelastic core materials consisted of 35-35-30 and 50-20-30 combinations of PBT-PB-G. ("PBT" being poly(butylene terephthalate), "PB" being a 5.7% mole ethylene copolymer with butene, and "G" being a selectively hydrogenated styrene-butadiene-styrene block copolymer.) The face sheets were mild steel, two different galvanized steels, and aluminum. Face sheet thicknesses were 0.241, 0.406, and 0.508 mm, giving laminate thicknesses between 1.4 and 1.9 mm. Comparisons were made with results obtained earlier for steel and aluminum metals and steel/PB (MPL-1-SD) and steel/PBT-G (70-30) laminates.

In order to minimize vibration, structure borne sound radiation, and airborne sound transmission in the low frequency, resonance controlled region, it is desirable to have high damping, and to a lesser extent high stiffness and mass, in a material panel. These quantities are minimized at higher frequencies by increasing the panel's surface mass. Considering the low frequency region of laminate panels, it has been shown that panel damping could be increased dramatically by increasing the damping of the core and, to a lesser extent, by decreasing core modulus of elasticity, increasing core thickness, and increasing face sheet thickness and/or modulus of elasticity. Panel stiffness can be increased drastically by increasing face sheet thickenss and, to a lesser extent, by increasing fact sheet modulus of elasticity and increasing core thickenss and/or modulus of elasticity.

Figure 6:
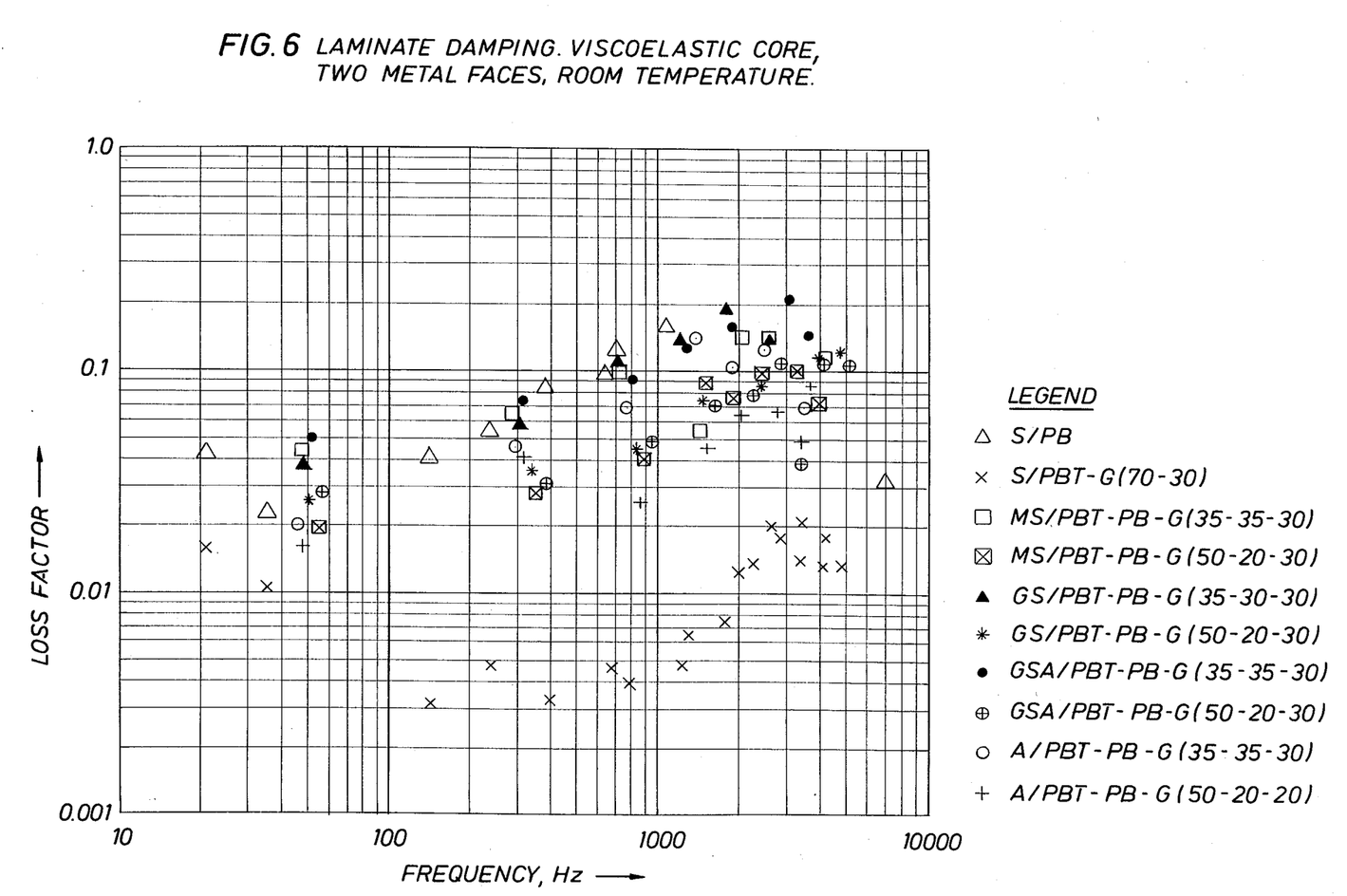
FIG. 6 shows laminate damping versus frequency for various laminates according to the invention.
Figure 7:
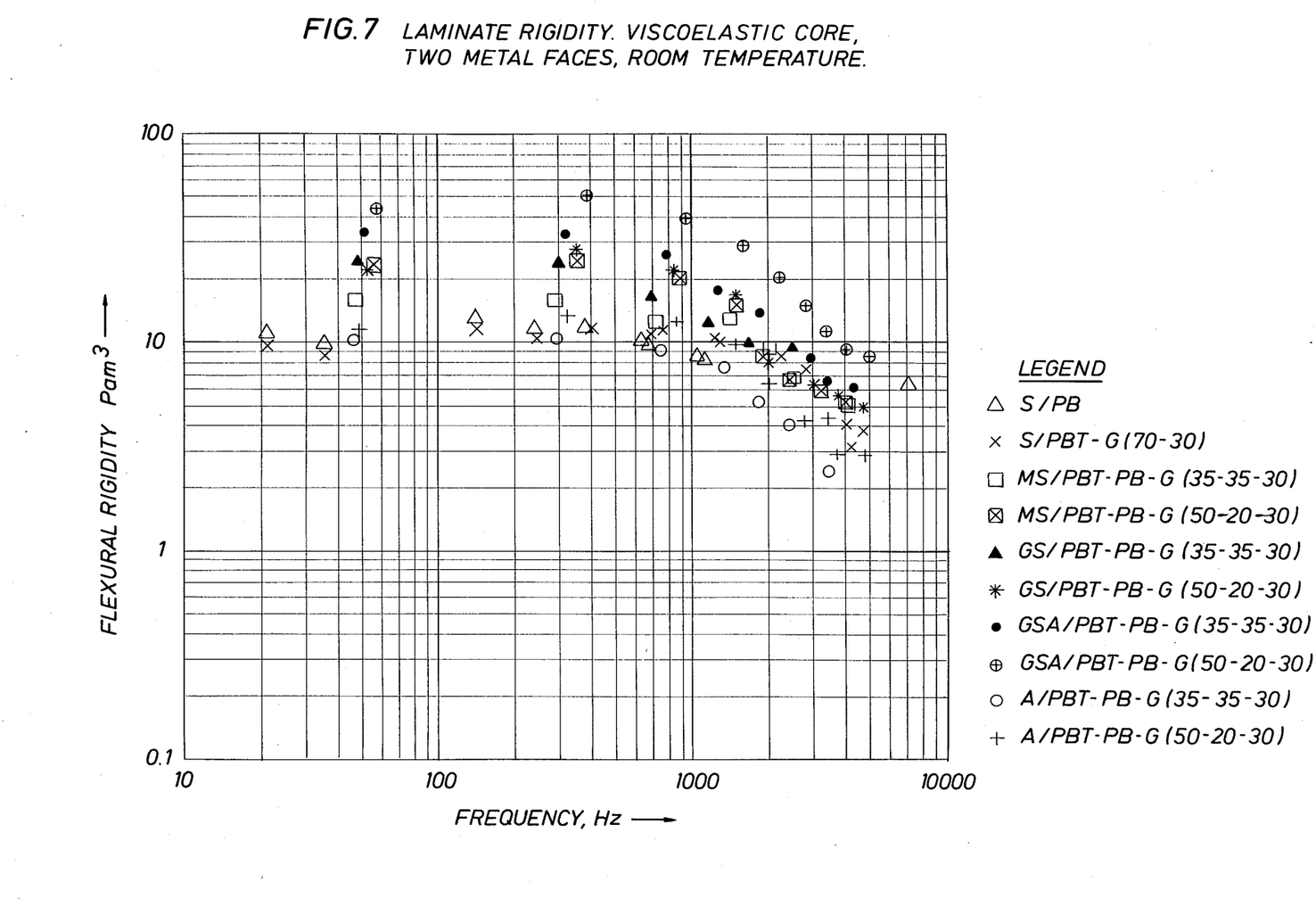
FIG. 7 shows laminate rigidity versus frequency for similar laminates.

In the study of this Embodiment, the above characteristics were verified. Specifically, Table 1 and FIGS. 6 and 7 show:

1. Laminates with the PBT-PB-G core of 35-35-30 combination have 2-3 times as much damping below 1000 Hz as equal thickness laminates with the 50-20-30 core.
2. The closest corresponding 35-35-30 laminate has somewhat more damping than the original MPL-1 laminate with PB core below 150 Hz. However, above 150 Hz, MPL-1 has somewhat higher damping than the 35-35-30 laminate.
3. The PBT-G (70-30) laminate has 0.05–0.10 of the damping of the PBT-PB-G and PB laminates.
4. The laminates with aluminum face sheets have damping values of 0.70 times the corresponding laminates with steel face sheets.
5. The 50-20-30 laminates have 1.5–2.0 times the stiffness of equal thickness 35-35-30 laminates below 1000 Hz.
6. The closest corresponding 35-35-30 laminate has 1.5 times the stiffness of the original MPL-1 (PB) laminate due to its higher core material thickness and modulus of elasticity.
7. For equal total thickenss, the higher face sheet thickness laminates have higher stiffness.
8. The aluminum faced laminates have 0.50 the stiffness of equal thickness steel faced laminates.
9. The low frequency, panel resonance vibration amplitudes, structure borne sound radiation, and airborne sound transmission vary inversely as the damping ratios.
10. The panel airborne sound transmission losses at frequencies above the resonance range and below the panel first critical vary directly as the ratios of surface mass densities (Table 1).

TABLE 1

LAMINATE PROPERTIES

| Material (Face/Core) | Mass Density (kg/m³) | Face Thickness (mm) | Total Thickness (mm) | Low Frequency Modulus of Elasticity (GPa) | Low Frequency Modulus of Rigidity (Pa·m³) | Surface Mass (kg/m²) | Transmission Loss (db re Steel at .871 mm) |
|---|---|---|---|---|---|---|---|
| Steel | 7730 | — | .871 | 700 | 11 | 6.73 | 0.0 |
| Aluminum | 2720 | — | 1.241 | 69 | 11 | 3.38 | −6.0 |
| Steel/PB | 4560 | .254 | 1.118 | 168 | 11 | 6.19 | −2.4 |
| Steel/PBT-G (70/30) | 4450 | .254 | 1.000 | 132 | 11 | 4.45 | −3.6 |
| Mild Steel/PBT-PB-G (35-35-30) | 3280 | .241 | 1.397 | 70 | 16 | 4.38 | −3.3 |
| Mild Steel/PBT-PB-G (50-20-30) | 3010 | .241 | 1.626 | 68 | 24 | 4.88 | −2.8 |
| Galv. Steel/PBT-PB-G (35-35-30) | 3510 | .241 | 1.800 | 49 | 24 | 6.41 | −0.4 |
| Galv. Steel/PBT-PB-G (50-20-30) | 3190 | .406 | 1.700 | 61 | 25 | 5.42 | −1.9 |
| Galv. Steel A/PBT-PB-G (35-35-30) | 4500 | .508 | 1.300 | 68 | 33 | 8.10 | 1.6 |
| Galv. Steel A/PBT-PB-G (50-20-30) | 4320 | .508 | 1.900 | 82 | 47 | 8.21 | 1.7 |
| Aluminum/PBT-PB-G (35-35-30) | 1860 | .406 | 1.600 | 32 | 11 | 2.98 | −7.1 |
| Aluminum/PBT-PB-G (50-20-30) | 1740 | .406 | 1.800 | 27 | 13 | 3.13 | −6.6 |

What is claimed is:

1. A metal-polymer-metal structural laminate having an unexpected property balance of high stiffness, improved sound damping, good adhesion between polymer and metal, and automotive paint bake oven stability, said laminate comprising a core of polymeric resinous material having tightly adhered to each side thereof a metal skin layer wherein:
   (a) said metal skin layer is about 5 to about 40 mils thick;
   (b) said laminate has a ratio of core thickness to skin thickness of between about 1:3 and about 20:1;
   (c) said laminate total thickness is between about 15 mils and about 300 mils;
   (d) said polymeric resinous material comprises the admixture obtained by intimately mixing a block copolymer, a butene-1 polymer and an engineering thermoplastic resin so as to form at least partial continuous interlocking networks wherein
      (i) said block copolymer comprises at least two monoalkenyl arene polymer end blocks A and at least one substantially completely hydrogenated conjugated diene mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000;
      (ii) said engineering thermoplastic resin has a generally crystalline structure and a melting point over about 120° C.; and
      (iii) said butene-1 polymer is selected from the group consisting of butene-1 homopolymers, butene-1-alphamonoolefin copolymers, functionalized butene-1 homopolymers, functionalized butene-1-alphamonoolefin copolymers and mixtures thereof where said alphamonoolefin is selected from ethylene, propylene and C₅ to C₁₀ alphamonoolefins and the alphamonoolefin content of said copolymers is between about 0.1 and about 30.0 mole percent; and
   (d) wherein said polymeric resinous material comprises 60 to 20 weight percent engineering thermoplastic, 15 to 40 weight percent butene-1 polymer and 25 to 40 weight percent block copolymer.

2. The structural laminate of claim 1 wherein the metal skin layers on each side of the core are different thicknesses.

3. The structural laminate of claim 1 wherein the metal skin layers on each side of the core are of different metals.

4. The laminate of claim 1 wherein the ratio of core thickness to skin thickness is between 1:2 and 3:1.

5. The laminate of claim 1 wherein the total laminate thickness is between 25 mils and 60 mils.

6. The laminate of claim 1 wherein the core incorporates a solid filler.

7. The structural laminate of claim 1 wherein the metal skin is steel.

8. The structural laminate of claim 1 wherein the metal skin is aluminum.

9. The structural laminate of claim 1 wherein said engineering thermoplastic resin is selected from the group consisting of thermoplastic polyesters, poly(aryl ethers), poly(aryl sulfones), polycarbonates, polyamides, acetal resins, thermoplastic polyurethanes, halogenated thermoplastics and nitrile barrier resins.

10. The structural laminate of claim 9 wherein said engineering thermoplastic resin is a thermoplastic polyester.

11. The structural laminate of claim 10 wherein said thermoplastic polyester has the generalized formula:

where n varies from 70 to 140.

12. The structural laminate of claim 10 wherein said thermoplastic polyester is poly(butylene terephthalate).

13. The laminate according to claim 1 wherein said block copolymer monoalkenyl arene is styrene and said block copolymer conjugated diene is selected from isoprene and butadiene.

14. The laminate according to claim 13 wherein said block copolymer has an ABA linear structure.

15. The laminate according to claim 13 wherein said block copolymer has a branched structure.

16. The laminate according to claim 10 wherein said block copolymer is a selectively hydrogenated block copolymer of styrene and butadiene, said butadiene having a 1,2 content of between about 35 and 55%.

17. The laminate according to claim 1 wherein said butene-1 polymer is a butene-1 homopolymer.

18. The laminate according to claim 1 wherein said butene-1 polymer is a butene-1-ethylene copolymer.

* * * * *